Patented Apr. 8, 1941

2,237,745

UNITED STATES PATENT OFFICE 2,237,745

THERMAL INSULATING CEMENT

John R. Musgrave, Joplin, Mo., assignor to The Eagle-Picher Lead Company, Cincinnati, Ohio, a corporation of Ohio No Drawing. Application April 6, 1939, Serial No. 266,415

7 Claims. (Cl. 106—18)

It is a well known fact that the application of plastic thermal insulation upon metal is usually attended by corrosion with consequent damage to the surface of the insulated object. It has heretofore been assumed that thermal insulating cements contained ingredients directly responsible for the attendant corrosion and many processes have been perfected to eliminate this disadvantageous feature, all of which have been more or less unsuccessful. In carrying out experiments to determine the nature of corrosion and the ingredient or mixture of ingredients present in thermal insulating cement responsible therefor, I have made the discovery that this corrosion takes place due to the presence of naturally occurring moisture and oxygen at the interface rather than any ingredient or ingredients contained in thermal insulating cement. In the application of thermal insulating cement the prepared product is normally mixed with water and then applied in place, whereupon it dries to form a porous layer by means of which it attains insulating value. It is this porosity which permits penetration of air to the interface of the metal during the drying period and accelerates corrosion.

It is an object of my invention to provide a new and improved method of preparing thermal insulating cement so that when applied to surfaces materially exposed to the effects of moisture and oxygen such corrosion will be inhibited.

My invention is based upon the use of a mineral wool, such as a rock, slag or glass wool, having definitely known chemical and physical characteristics, as compared with the customary practice heretofore in use of merely mixing together certain ingredients whose chemical and physical characteristics were not considered either singly or in the finished compound. Heretofore in the preparation of insulating compounds and in particular insulating cement it has been assumed that little attention need be given to the composition of the mineral wool, apparently due to the assumption that mineral wools have the same or similar composition so that thermal insulating cement compounded from one kind of mineral wool gives equally good results as when compounded with any other type. By analysis I have determined that mineral wools vary widely in their composition and the result achieved by the use of one mineral wool may not be possible with another or other mineral wools because of variations in the chemical and physical characteristics of these mineral wools.

In the practice of my invention I have found the best results can be achieved through the use of a mineral wool having approximately the following composition:

|  | Percent |
|---|---|
| Iron oxide (FeO or $Fe_2O_3$) | 30 |
| Calcium oxide (CaO) | 11 |
| Magnesium oxide (MgO) | 1 |
| Aluminum oxide (AlO) | 10 |
| Silicon dioxide ($SiO_2$) | 40 |
| Zinc oxide (ZnO) | 8 | wherein the following materials found in the wool can be considered as acid, basic or neutral:

| Silicon dioxide | Acid |
|---|---|
| Iron oxide | Basic |
| Calcium oxide | Basic |
| Magnesium oxide | Basic |
| Zinc oxide | Basic |
| Aluminum oxide | Neutral | giving a ratio of 40 parts of acid material opposed to 50 parts of basic material and a ratio of 40 parts of silica to 42 parts of highly basic materials, namely calcium oxide, magnesium oxide and iron oxide, or approximately one part of acid material to one part of highly basic material.

I next add a suitable binder, of which bentonite is an example, and then thoroughly agitate before adding a fibrous reinforcing material such as asbestos. As addition agent for preventing corrosion I add sodium or potassium salts of nitrite ($NaNO_2$ or $KNO_2$), chromate ($Na_2CrO_4$ or $K_2CrO_4$) or dichromate ($Na_2Cr_2O_7$ or $K_2Cr_2O_7$) in an amount up to 3 per cent by total weight, together with a buffer which may be an alkaline salt in an amount up to 3 per cent by total weight which will enhance or activate the corrosion inhibiting qualities of the addition agent by maintaining a pH range from 7.1 to 11, when wet with water to give to the mass a plasticity suitable for application.

As an example for carrying out my process I may prepare a mixture of ingredients having substantially the following proportions:

|  | Per cent |
|---|---|
| Mineral wool | 60 |
| Asbestos | 10 |
| Bentonite clay | 25 |
| Tri-sodium phosphate | 3 |
| Sodium nitrite | 2 |

As evidenced by the foregoing example, the tri-sodium phosphate acts to enhance or activate the sodium nitrite and to maintain a pH of approximately 9 in the thermal insulating cement during drying. Instead of sodium nitrite I may use potassium nitrite or a sodium or potassium salt of chromate or dichromate. While I have disclosed a dry mixture of ingredients in the foregoing example, it is to be understood the scope of my invention includes mixtures to which enough water has been added to give the mass a plasticity suitable for application to the surface to be insulated. It is understood, of course, that mineral wools having a composition other than given above may give equally satisfactory results and my invention contemplates all mineral wools having such a composition.

Having thus described my invention, what I claim as new and desire to secure by Letters Patent is:

1. A thermal insulating cement comprising a substantially neutral mineral wool, asbestos, bentonite, tri-sodium phosphate and sodium nitrite.

2. A thermal insulating cement characterized by the presence of tri-sodium phosphate and sodium nitrite as two of the active ingredients, said tri-sodium phosphate enhancing or activating the corrosion inhibiting qualities of the sodium nitrite by maintaining a pH range from 7.1 to 11, when wet with water to give the mass a plasticity suitable for application to surfaces to be insulated.

3. A thermal insulating composition comprising a rigid mass consisting of a substantially neutral fibrous material, a binder, a reinforcing material, tri-sodium phosphate and sodium nitrite.

4. A thermal insulating composition comprising a rigid mass including substantially neutral mineral wool and characterized by the presence of tri-sodium phosphate and sodium nitrite as two of the active ingredients.

5. A thermal insulating cement comprising an alkaline mineral wool, asbestos, bentonite, tri-sodium phosphate and sodium nitrite.

6. A thermal insulating composition comprising a rigid mass consisting of an alkaline fibrous material, a binder, a reinforcing material, tri-sodium phosphate and sodium nitrite.

7. A thermal insulating composition comprising a rigid mass including alkaline mineral wool and characterized by the presence of tri-sodium phosphate and sodium nitrite as two of the active ingredients.

JOHN R. MUSGRAVE.